United States Patent [19]

Marumo et al.

[11] Patent Number: 4,790,859
[45] Date of Patent: Dec. 13, 1988

[54] METHOD OF SEPARATING GASEOUS MIXTURE

[75] Inventors: Chisato Marumo, Neyagawa; Eiji Hayata, Osaka, both of Japan

[73] Assignee: Kanebo, Ltd., Tokyo, Japan

[21] Appl. No.: 21,119

[22] Filed: Mar. 3, 1987

[30] Foreign Application Priority Data

Oct. 18, 1986 [JP] Japan ................. 61-248146

[51] Int. Cl.$^4$ .............................................. B01D 53/04
[52] U.S. Cl. ............................................ 55/68; 55/26; 55/58; 55/62; 55/75
[58] Field of Search .................... 55/25, 26, 58, 62, 68, 55/74, 75, 387, 389, 523, 524; 264/29.1, 29.5; 502/418, 430, 432, 436, 438, 527

[56] References Cited

U.S. PATENT DOCUMENTS

| 3,454,502 | 7/1969 | Hiltgen et al. | 502/527 X |
| 3,545,622 | 12/1970 | Sakhnovsky et al. | 55/389 X |
| 3,573,122 | 3/1971 | Olstowski et al. | 264/29.1 X |
| 3,639,266 | 2/1972 | Battista | 502/432 |
| 3,801,513 | 4/1974 | Munzner et al. | 55/75 X |
| 4,024,226 | 5/1977 | Lersmacher et al. | 264/29.1 X |
| 4,082,694 | 4/1978 | Wennerberg et al. | 55/75 X |
| 4,154,704 | 5/1979 | Vinton et al. | 502/432 X |
| 4,205,055 | 5/1980 | Maire et al. | 264/29.1 X |
| 4,234,326 | 11/1980 | Bailey et al. | 55/387 X |
| 4,350,672 | 9/1982 | Layden, Jr. et al. | 264/29.1 X |
| 4,381,929 | 5/1983 | Mizuno et al. | 55/387 X |
| 4,399,052 | 8/1983 | Sugino | 264/29.1 X |
| 4,444,572 | 4/1984 | Avon et al. | 55/26 |

FOREIGN PATENT DOCUMENTS

| 3214771 | 10/1983 | Fed. Rep. of Germany | 55/25 |
| 75690 | 6/1977 | Japan | 55/389 |
| 57-51109 | 3/1982 | Japan . | |
| 58-54082 | 12/1983 | Japan . | |
| 61-6108 | 1/1986 | Japan . | |
| 61-31052 | 7/1986 | Japan . | |
| 7804596 | 10/1979 | Netherlands | 55/26 |

Primary Examiner—Robert Spitzer
Attorney, Agent, or Firm—Flynn, Thiel, Boutell & Tanis

[57] ABSTRACT

A method of separating at least a first gas from a gaseous mixture, in which a gaseous mixture containing a first and a second gas having different chemical compositions in an amount of at least 50% by volume based on the entire mixture is contacted with a carbonaceous porous body having a carbon content of at least 85% by weight and containing open cells in a three-dimensional network structure so that the open cells of the porous body form substantial flow passages for the gaseous mixture, thereby to adsorb at least the second gas physically on the porous body.

15 Claims, 5 Drawing Sheets

METHOD OF SEPARATING GASEOUS MIXTURE

This invention relates to a method of separating a gaseous mixture, and more specifically, to a method of separating a mixture of at least two gases having different chemical compositions by physical adsorption.

With the recent advance in the semiconductor technology, there has been an increasing use of nitrogen gas as an atmospheric gas required in the production of semiconductor devices. For the production of nitrogen gas, a device for separating nitrogen from oxygen by utilizing the oxygen adsorption activity of an adsorbent, which will supersede the conventional low temperature liquefying separation device, has been developed. This device was built by applying a pressure swing adsorption method (to be abbreviated as the PSA method) which comprises feeding air as a raw material under pressure into an adsorption tower packed with an adsorbent having a molecular sieving effect, such as granular molecular sieving carbon (MSC, a product of Bergbau Forshung), to adsorb oxygen selectively on the adsorbent and thus produce a gas rich in nitrogen (see Japanese Patent Publication No. 17595/1969 and British Pat. No. 1480866). Nitrogen gas is obtained as a non-adsorbing component, and by desorbing the gas adsorbed on the adsorbent, a gas rich in oxygen can be produced. The device utilizing the PSA method has come into use in place of the low temperature liquefying separation device because it is relatively small in size and is convenient to operate and can be continuously operated without an operator. According to the PSA method, a device having a capacity of about 50 to 1000 $Nm^3/H$ has the advantage that the unit power cost is lower than that of the low temperature liquefying separation device and the product gas becomes lower in price. However, a device having a capacity of less than about 50 $Nm^3/H$ is economically very inferior because the unit power cost is very high. To decrease the unit power cost of the small-sized PSA device, it is necessary to improve the gas-separating characteristics of the adsorbent and thus decrease the size of the adsorption tower, decrease the sizes of annexed facilities such as an air compressor or a vacuum pump, and thus to reduce the required power.

In order to examine the adsorption characteristics of the molecular sieving carbon (MSC) used in the conventional PSA device, the present inventors studied the mechanism of adsorption and desorption of the MSC (usually in the form of a small solid cylinder having a diameter of 2 to 4 mm and a length of 3 to 5 mm) by taking its photograph through a scanning electron microscope. This study led to the following discovery. In such a granular MSC in small chip form, a relatively large pore (macropore) 101 for the inflow of the starting air is formed on the surface of MSC as schematically shown in FIG. 6, and on the wall surface of the macropore 101, micropores 102 having a molecular sieving action are distributed to form a twostage pore structure. The starting air comes into the macropore 101 from its opening 101a where oxygen is selectively adsorbed. Then, the air turns and flows reversely in the macropore 101, and goes out of it from the opening 101a The air is separated by this flow of the starting air. When the MSC chips are filled in the adsorption tower, the starting air passes through the spaces between MSC chips and enters the macropore 101 of each of the individual MSC chips where oxygen is selectively adsorbed. The remainder goes out from the macropores, and again enters the next macropore 101 where oxygen is selectively adsorbed. This action is repeated, and the remainder of the starting air is led out of the adsorption tower through the spaces among the MSC particles. In the conventional granular MSC, the flow passage required for separation of the starting air are relatively long, and this is a main cause of retarding the speed of adsorption and desorption. FIG. 7 of the accompanying drawings is a scanning electronmicrograph (magnification 100) of the above granular MSC. The relatively large hole-like portions seen in the micrograph are the opening portions of macropores.

Japanese Laid-Open Patent Publication No. 6108/1986 discloses molecular sieving carbon having the maximum value of the pore diameter distribution in a region not more than 10 Å and a pore volume of not more than 0.1 $cm^3/g$ in a pore diameter range of 15 to 200 Å, which is produced from a mixture of a phenolic resin and a polyvinyl alcohol resin. This molecular sieving carbon is one of those adsorbents which have a high adsorption volume and a high speed of adsorption and desorption. The working examples given in this patent document disclose experiments for obtaining basic adsorption data, in which a gaseous mixture of n-butane and iso-butane, a gaseous mixture of iso-pentane and neo-pentane and a gaseous mixture of dichloromethane and n-heptane were diluted with nitrogen gas so that the concentration of the two gases in each mixture became 10% by volume, and the diluted gases were each passed through an adsorption tower packed with the above molecular sieving carbon. The general description of this patent document, on the other hand, discloses a possibility of using the molecular sieving carbon for separation of hydrocarbon isomers and mixed hydrocarbon gases, separation and purification of hydrogen gas, or separation of nitrogen from oxygen in the air by pressure swing adsorption. However, it fails to give any specific description or suggestion on such a possibility.

It is an object of this invention to provide an efficient separating method for a gaseous mixture.

Another object of this invention is to provide a method of efficiently separating at least a first gas by physical adsorption from a gaseous mixture, for example air, containing the first gas and a second gas having different chemical compositions, such as nitrogen and oxygen, in an amount of at least 50% by volume based on the entire mixture.

Still another object of this invention is to provide a method of efficiently separating a gaseous mixture using an adsorbent having a high volume of adsorption and high speeds of adsorption and desorption, in which the adsorbing and desorbing ability of the adsorbent is utilized to a maximum.

Yet another object of this invention is to provide a method of efficiently obtaining a desired gas by subjecting a gaseous mixture to bulk separation by a pressure swing adsorption method.

Further objects of this invention along with its advantages will become apparent from the following description.

According to this invention, the objects and advantages are achieved by a method of separating at least a first gas from a gaseous mixture, which comprises contacting a gaseous mixture containing a first and a second gas having different chemical compositions in an amount of at least 50% by volume based on the entire mixture with a carbonaceous porous body having a carbon content of at least 85% by weight and containing open cells in a three-dimensional network structure so that the open cells of the porous body form substantial flow passages for the gaseous mixture, thereby to adsorb at least the second gas physically on the porous body.

Figure 1:
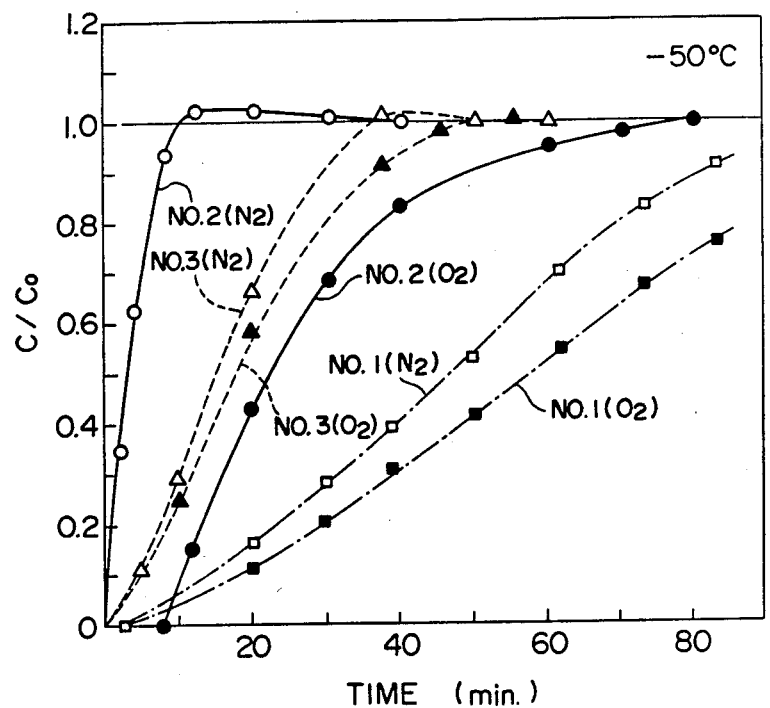
FIG. 1 is a breakthrough curve in an air separation test using the carbonaceous porous body in accordance with this invention, in which the abscissa represents the time (minutes) and the ordinate, the ratio of the concentration (C) of the outlet gas to the concentration (Co) of the inlet gas, C/Co.
Figure 6:
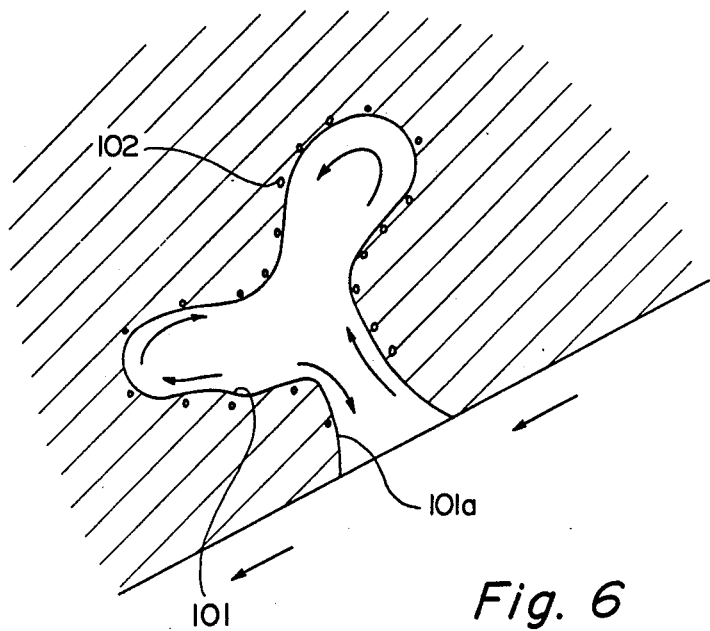
FIG. 6 is a schematic explanatory view showing the macropore of granular MSC.

The gaseous mixture which is to be separated by the method of this invention contains two gases (the first and second gases) in a proportion of at least 50% by volume, preferably at least 75% by volume, more preferably at least 90% by volume, based on the total volume of the gaseous mixture. The volume percents herein are based on the volumes under standard conditions, namely at 0° C. and 1 atmosphere pressure.

Examples of the gaseous mixture to be conveniently separated by the method of this invention include gaseous mixtures containing hydrogen and methane as main components such as an ethylene plant offgas and a coke furnace offgas; gaseous mixtures containing hydrogen and carbon dioxide as main components such as methanol reformed gas generated by reaction of methanol with steam and steam reforming gas; gaseous mixtures containing carbon monoxide and methane as main components such as a gaseous mixture obtained by separating hydrogen gas from a coke furnace offgas; gaseous mixtures containing hydrogen and carbon monoxide as main components such as a gaseous mixture resulting from decomposition of methanol; gaseous mixtures containing nitrogen and carbon monoxide as main components such as a converter offgas; and gaseous mixtures containing nitrogen and oxygen as main components such as air.

The compositions of the above gaseous mixtures are disclosed in literature references and textbooks. For example, the ethylene plant offgas typically contains 94 to 96% of hydrogen and 4 to 6% of methane and minor amounts of ethane, ethylene, nitrogen, etc. The coke furnace offgas contains 55 to 57% of hydrogen, 26 to 27% of methane, 6 to 7% of carbon monoxide and 2 to 3% of carbon dioxide. The methanol reformed gas contains about 75% of hydrogen and about 24% of carbon dioxide as main components and minor amounts of carbon monoxide, methane, etc.

The adsorbent used in this invention contains at least 85% by weight, preferably at least 90% by weight, of carbon. The upper limit of the carbon content substantially reaches 100%, and is usually about 98%. Elements contained in addition to carbon are usually oxygen, hydrogen and nitrogen.

The adsorbent used in this invention is a carbonaceous porous body containing open cells in a three-dimensional network structure. These open cells constitute substantial flow passages for the gaseous mixture to be separated. The average diameter of the open cells is preferably 1 to 500 micrometers, more preferably 10 to 300 micrometers.

Owing to the presence of such open cells, the carbonaceous porous body usually has an apparent density of 0.1 to 0.8 g/cm$^3$, preferably 0.3 to 0.65 g/cm$^3$, and a porosity of 50 to 95%, preferably 60 to 82%.

The carbonaceous porous body used in this invention may be prepared from polyvinyl alcohol, a melamine resin and a phenol resin by, for example, preparing a porous body of a synthetic resin from 10 to 50% by weight of polyvinyl alcohol, 10 to 40% by weight of the melamine resin and 80 to 70% by weight of the phenolic resin, and carbonizing the porous body in a non-oxidizing atmosphere at a temperature of 500° to 700° C. The resulting carbonized product can be directly used as the carbonaceous porous body in this invention. If desired, it is used after activating it by heat-treating it in an oxidizing atmosphere at a temperature of 500° to 700° C. within the weight loss of the carbonized product being up to 15% by weight.

Polyvinyl alcohol may be used as such or as a polyvinyl acetal resin such as polyvinyl formal or polyvinyl benzal obtained by acetalization of polyvinyl alcohol.

The melamine resin is an initial-stage condensate of melamine and formaldehyde usually having solubility in water.

A resol resin or novolak resin in solution form can be conveniently used as the phenolic resin.

Production of the porous body of synthetic resin from the polyvinyl alcohol, melamine resin and phenolic resin is carried out by adding a pore-forming material such as starch, a modified starch, a starch derivative or a water-soluble metal salt to these raw materials in any desired step of specific methods described below in accordance with the methods described in, for example, Japanese Patent Publication No. 54082/1983, Japanese Laid-Open Patent Publication No. 51109/1982, and Japanese Patent Publication No. 31052/1986. As a result, a plastic porous body containing open-cellular macropores in a network structure can be produced.

Examples of the specific methods include a method which comprises reacting polyvinyl alcohol with a crosslinking agent in the presence of a curing catalyst to produce a polyvinyl acetal resin such as polyvinyl formal or polyvinyl benzal, and applying predetermined amounts of the melamine resin and the phenolic resin to the acetal resin by such means as impregnation; a method which comprises uniformly mixing polyvinyl alcohol with a liquid melamine resin or a liquid phenolic resin, adding a crossmelamine linking agent and a curing agent or a curing catalyst, copolymerizing the above mixture, and then applying the remaining one resin to the copolymer; and a method which comprises uniformly mixing polyvinyl alcohol, a liquid melamine resin and a liquid phenolic resin, adding a crosslinking agent and a curing agent or a curing catalyst, and copolymerizing the above mixture.

Suitable examples of the crosslinking agent, curing agent and curing catalyst used in these reactions are as follows: Aldehydes such as formaldehyde and benzaldehyde are suitable as crosslinking agents for polyvinyl alcohol. Suitable catalysts for the acetalization reaction of polyvinyl alcohol and the curing reaction of the phenolic resin are hydrochloric acid, sulfuric acid, oxalic acid, lactic acid, p-toluenesulfonic acid, maleic acid and malonic acid. Examples of suitable curing agents for the melamine resin include inorganic acids such as hydrochloric acid and sulfuric acid, carboxylic acid esters such as dimethyl oxalate, and amine hydrochlorides such as ethylamine hydrochloride and triethanolamine hydrochloride.

A preferred combination of the raw materials comprises 15 to 40% by weight of polyvinyl alcohol, 15 to 30% by weight of the melamine resin and 40 to 65% by weight of the phenolic resin. A more preferred combination comprises 20 to 30% by weight of polyvinyl alcohol, 15 to 25% by weight of the melamine resin and 45 to 60% by weight of the phenolic resin.

The weight percentages of the raw materials are based on the total weight of the polyvinyl alcohol, melamine resin and phenolic resin.

The carbonaceous porous body used in this invention is obtained by carbonizing the resulting porous body of synthetic resin in a non-oxidizing atmosphere at a temperature of 500° to 700° C.

No detailed mechanism has yet been elucidated on the formation of a molecular sieving carbonaceous porous body from the porous body of the synthetic resin. It is believed however that when the porous body of the synthetic resin is heated at a controlled temperature elevation rate, thermal decomposition of the porous body begins at about 200° C., proceeds at higher temperatures, and becomes especially vigorous at about 300° to 500° C., and in the course of this temperature elevation, very fine micropores having a pore diameter of not more than 10 Å form on the surface of the carbonization product which is left after thermal decomposition. The micropores increase further by activation at a temperature of 500° to 700° C.

The pore volume and pore radius of the micropores are measured by analysis using a nitrogen adsoprtion isotherm and the Kelvin equation to be described hereinafter. The above analysis shows that micropores having a pore diameter of not more than 10 Å are usually formed in an amount corresponding to a pore volume of about 0.01 to 0.1 cm$^3$/g by carbonization at a temperature in the range of 500° to 700° C.

The pore diameter of the micropores formed by carbonization in a nonoxidizing atmosphere depends also upon the rate of temperature elevation, and the pore diameter tends to increase with increasing rate of temperature elevation. Hence, in the production of the molecular sieving carbonaceous porous body, the rate of temperature elevation is preferably slower. Usually, the rate of temperature elevation above 200° C. is preferably not more than 120° C./hr, more preferably not more than 90° C./hr, most preferably not more than 60° C./hr.

The carbonized product obtained as above can be directly used as a molecular sieving carbon. By activating the carbonized product at a temperature of 500° to 700° C. in an oxidizing atmosphere such as an atmosphere of steam or an atmosphere of carbon dioxide gas, micropores having a pore diameter of not more than 10 Å can be markedly increased, and its molecular sieving ability can be markedly increased.

If the weight loss by activation exceeds 15% of the weight of the carbonized product obtained by carbonization in a non-oxidizing atmosphere, the pore diameter of the micropores increases and the molecular sieving effect of the resulting carbon tends to be decreased greatly. The weight loss by activation is preferably within 12% by weight, most preferably within 10% by weight, of the weight of the carbonized product before activation.

In the method of this invention, the carbonaceous porous body, preferably having a maximum value of the pore diameter distribution at a pore diameter of not more than 10 Å and a pore volume at a pore diameter in the range of 15 to 200 Å of not more than 0.1 cm$^3$/g, is used as an adsorbent.

The method of this invention is carried out by contacting the aforesaid gaseous mixture with the carbonaceous porous body so that the open cells of the porous body form substantial flow passages for the gaseous mixture. As a result, at least one gas (second gas) in the gaseous mixture is adsorbed physically on the porous body, and at least one other gas (first gas) is obtained.

For example, if the gaseous mixture is air, the first gas is nitrogen, and the second gas is oxygen. If the gaseous mixture is a coke furnace offgas, the first gas is hydrogen and the second gas is methane. If the gaseous mixture is a mixture obtained after separating hydrogen from the coke furnace gas, the first gas is carbon monoxide and the second gas is methane. If the gaseous mixture is a methanol reformed gas, the first gas is hydrogen and the second gas is carbon dioxide.

In the method of this invention, the gaseous mixture is contacted with the porous body so that the open cells of the porous body in a three-dimensional network structure form substantial flow passages of the gaseous mixture. This can be effected by providing a container having an inlet and an outlet for the gaseous mixture at positions separated from each other, filling the porous body having a cross section with substantially the same size and shape in contour as those of a cross-section of the container space taken at right angles to the direction extending from the inlet to the outlet, and passing the gaseous mixture from the inlet of the container. Since the inner wall surface of the container seals up the peripheral surface of the porous body (the outside surface of the porous body parallel to the direction in which the gaseous mixture passes through the open cells of the porous body in a three-dimensional network structure), the gaseous mixture which enters the open pores of the porous body from the inlet surface escape from the outlet surface without escaping from the peripheral surface of the porous body.

Instead of sealing the peripheral surface of the porous body with the inside wall surface of the container, at least a part of the peripheral surface or outside surface of the porous body may be sealed air-tight against the gaseous mixture. The peripheral surface of the porous body can, for example, be sealed by coating it with a thermoplastic resin such as nylon or polyethylene or a thermosetting resin such as an epoxy resin or phenolic resin, or covering it with a heat shrinkable film prepared from a material containing polyvinyl chloride or a polyolefin as a main component.

The porous body may be in the form of, for example, a cylinder, circle or disc.

In the present invention, the gaseous mixture is contacted with the porous body preferably under atmospheric or elevated pressure. For example, pressures of 2 to 9 kg/cm$^2$ (0.196 to 0.883 MPa) are preferably employed as the elevated pressure conditions. The preferred temperature at the time of contacting is usually 0° to 35° C.

The gaseous mixture is passed through the porous body at a rate of 1 to 50 cm/sec, preferably 3 to 30 cm/sec, as a superficial linear velocity, although strictly it varies depending upon the type of the gaseous mixture.

Since during the passing of the gaseous mixture through the porous body, the second gas is adsorbed on the porous body and the first gas goes out unadsorbed, the first gas in the gaseous mixture can be separated from the second gas.

The second gas adsorbed on the porous body can be desorbed by stopping the supply of the gaseous mixture to the porous body, and then heating the porous body at a higher temperature or exposing it to a lower pressure. For example, when the adsorption pressure is as high as about 4 to 9 kg/cm$^2$, the desorption can be carried out at atmospheric pressure. When the adsorption pressure is relatively low, for example about 2 to 5 kg/cm$^2$, it is preferred to regenerate the porous body (desorb the adsorbed gas) under reduced pressure by using a vacuum pump.

In a preferred embodiment, the present invention provides a method of separating at least a first gas from a gaseous mixture, which comprises (1) contacting a gaseous mixture containing a first and a second gas having different chemical compositions under elevated pressure with a carbonaceous porous body having a carbon content of at least 85% by weight and containing open cells in a three-dimensional network structure so that the open cells of the porous body form substantial flow passages for the gaseous mixture, thereby to adsorb at least the second gas physically on the porous body, (2) thereafter desorbing the second gas physically adsorbed on the porous body under atmospheric or reduced pressure, and (3) repeating the steps (1) and (2).

According to the above preferred embodiment, a mixture of nitrogen (first gas) and oxygen (second gas), such as air, can be very efficiently separated.

According to the present invention, the method of this invention can be advantageously carried out by a separating device (PSA device) comprising (A) an air compressor for compressing air taken from outside, (B) a plurality of adsorption towers filled with a generally pillar-like or cylindrical adsorbent with its peripheral surface being sealed, (C) a plurality of inflow passage pipes for communication between the air compressor and the inlets of the adsorption towers, (D) a plurality of first on-off valves provided respectively in the inflow passage pipes, (E) means for regenerating the adsorption towers, (F) a plurality of regeneration passages for communication between the regeneration means and the adsorption towers, (G) a plurality of second on-off valves provided respectively in the regeneration passages, (H) on-off valve controlling means for controlling opening or closing of the first and second on-off valves so that one or more adsorption towers are in operation and the remaining adsorption towers are being regenerated or at rest, and (I) product gas withdrawing passages extending from the outlets or inlets of the adsorption towers.

This separating device, as will be described in detail in a working example, is operated in five steps, i.e., adsorption, pressure equalization (pressure reduction), evacuation, pressure equalization (pressure elevation), and pressure elevation. The pressure equalization step is carried out by concurrent pressure equalization whereby a gas is caused to flow in the same direction as the flowing direction of the starting air (gaseous mixture) or countercurrent pressure equalization whereby a gas is caused to flow in a direction opposite to the flowing direction of the starting air. Investigations of the present inventors have shown that the concurrent pressure equalization more easily permits production of a high-purity gas. It is possible to operate the PSA device in three steps of adsorption, evacuation and pressure elevation, or four steps of adsorption, pressure reduction, purging and pressure elevation by omitting the pressure equalization step. To increase the unit power cost in a small-sized PSA device, it is frequently advantageous to use two adsorption towers. The method of this invention can also be carried out by using a so-called rapid PSA device in which an adsorption-desorption cycle is quickened by using a single tower.

The various properties used in this invention were measured as follows:

(1) Measurement of the pore volume and pore size distribution

The pore volume and the pore size distribution of the porous body of the invention are measured by a mercury penetration method using a porosimeter (Poresizer 9310 made by Shimazu Seisakusho) for a pore diameter range of from 60 Å to 500 micrometers.

For a pore diameter of less than 60 Å, they are determined by the Kelvin equation from the adsorption isotherm of nitrogen gas.

$$\ln P/P_o = \frac{-2 \cdot V\gamma\cos\theta}{r_k RT}$$

P: the saturated vapor pressure of the gas when it is adsorbed to pores
$P_o$: the saturated vapor pressure of the gas in a normal condition
$\gamma$: the surface tension
V: the volume of one molecule of liquid nitrogen
R: gas constant
T: absolute temperature
$r_k$: the Kelvin radius of the pores Correction against the Kelvin radius of pores was carried out by the Cranston-Inkley method.

(2) Porosity

The porosity (P) is calculated in accordance with the following equation $$P = 1 - \rho_A/\rho_T$$

from the true density ($\rho_T$) measured by a helium gas replacing method with an air comparison-type pycnometer (Model 930, made by Beckman Co.) and the apparent density ($\rho_A$) measured by calipers.

(3) Carbon content: Measured by an elemental analysis device (CHN CORDER, MF-3 type) made by Yanagimoto Seisakusho Co., Ltd.

(4) Gas concentration analysis

Analyzed by using a Shimazu gas-chromatograph GC-9A and an oxygen concentration analyzer (Model 0260) made by Beckman Co.

The following Examples illustrate the invention more specifically.

EXAMPLE 1

(1) Five hundred grams of polyvinyl alcohol having a degree of polymerization of 1700 and a degree of saponification of 99% was dispersed in water, and after dissolving by heat, 800 g of potato starch was added to perform gelatinization. The product was cooled to room temperature, and 700 g of 87% formalin and 250 g of 50% by weight sulfuric acid were added and uniformly mixed. The amount of the liquid was adjusted by using a moderate amount of water to adjust the total amount of the liquid to 10 liters. The mixture was cast into a square mold having a size of 250×250 mm, and subjected to crosslinking reaction in hot water at 60° C. for 24 hours. The product was washed with water to give a porous body of polyvinylformal (PVF) having a crosslinked structure. The PVF porous body was molded into a prism shape, and then immersed in a solution of a melamine resin (Sumitex Resin M-8, curing agent Sumitex Resin ACX, products of Sumitomo Chemical Co., Ltd.) in a solids concentration of 10 to 50% by weight. The porous body was then separated by centrifugation, and then the applied melamine resin was cured at 90° C. for 24 hours. Furthermore, it was immersed in a solution of a water-soluble resol resin (BRL-2854, a product of Showa Polymer Co., Ltd.) in a solids concentration of 20 to 50% by weight, and heated at 90° C. for 24 hours to cure the applied resol resin. In this way, eight synthetic resin porous bodies having the composition shown in Table 1 were obtained.

Each of the porous bodies was placed in an electrical furnace, heated in an atmosphere of nitrogen at a rate of 30° C./hr, and carbonized at 670° C.

The properties of the carbonized products are shown in Table 1. The pore size distributions and pore volumes of the samples were determined from the adsorption isotherm of nitrogen gas. The accuracy of the Kelvin equation decreases with decreasing pore diameter. By applying the Kelvin equation to pore diameters of up to 10 Å, it was determined whether the maximum value of the pore size distribution of the sample was 10 Å or below.

TABLE 1

| Run No. | 1 | 2 | 3 |
|---|---|---|---|
| Composition (wt. %) | | | |
| Polyvinyl alcohol-type resin | 30 | 30 | 20 |
| Melamine resin | 50 | 25 | 5 |
| Phenolic resin | 20 | 45 | 75 |
| Properties of the carbonized product | | | |
| Apparent density (g/cm$^3$) | 0.219 | 0.224 | 0.257 |
| Porosity (%) | 87 | 86 | 84 |
| Average macropore diameter ($\mu$m) | 32 | 31 | 33 |
| Specific surface area (m$^2$/g) | 524 | 371 | 462 |
| Maximum value (Å) of the pore diameter distribution | <10 | <10 | <10 |
| Pore volume of pores with a pore diameter of 15 to 200 Å (cm$^3$/g) | 0.045 | 0.032 | 0.071 |

(2) Using each of the samples, an air separation test at −50° C. was caried out. The sample was set with a filling length of 30 mm $\phi$ × 500 mm L in a stainlesss steel adsorption tower in a flowing-type adsorption device. A gaseous mixture composed of 90% of He and 10% of dry air was passed through the adsorption tower at a flow rate of 20N ml/min., and the concentration of the outlet gas from the adsorption tower was periodically measured. The ratio of the concentration (C) of the outlet gas to the concentration (Co) of the inlet gas, C/Co, was calculated. Based on the obtained data, a backthrough curve was drawn. The temperature of the adsorption tower was controlled by using a combination of liquid nitrogen and a band heater. The concentrations of nitrogen and oxygen gases were measured by a gas chromatography (TCD detector; column molecular sieve 5A). FIG. 1 shows the results obtained.

With sample No. 2, effective separation of nitrogen and oxygen was observed, but with samples Nos. 1 and 3, nitrogen and oxygen were adsorbed to nearly the same extent, and it was very difficult to separate these gases from each other.

EXAMPLE 2

As in Example 1, 4 kg of polyvinyl alcohol having a degree of polymerization of 1700 and a degree of saponification of 88% was dissolved in hot water, and 8 kg of wheat starch was added to perform gelatinization. To the resulting solution was added a solution of a water-soluble resol resin (BRL-2894, a product of Showa Polymer Co., Ltd.) in a solids concentration of 60% by weight, and the mixture was fully stirred. Furthermore, the mixture was uniformly mixed with 7 kg of 37% formalin and 3 kg of 30% by weight oxalic acid. The amount of the resulting mixture was adjusted by using a suitable amount of water to adjust its total amount to 100 liters. The mixture was cast in a square mold having a size of 620×620 mm and reacted as in Example 1 to form a porous body of PVA/phenolic synthetic resin.

The porous body was cut into a prism shape having a size of 100×100×500, and the melamine resin was applied to it as in Example 1 to give a porous body of a synthetic resin composed of 20% by weight of the polyvinyl alcohol-type resin, 20% by weight of the melamine resin and 60% by weight of the phenolic resin.

The porous body was placed in an electrical furnace, heated in an atmosphere of nitrogen to a predetermined activating temperature at a temperature elevation rate of 50° C./hr, and activated in an atmosphere of steam for a predetermined period of time. The physical properties of the resulting activated porous bodies are shown in Table 2.

TABLE 2

| Run No. | 4 | 5 |
|---|---|---|
| Activating temperature (°C.) | 650 | 850 |
| Activating time (minutes) | 15 | 20 |
| Weight loss by activation (wt. %) | 2.3 | 21.4 |
| Properties of the activated product | | |
| Apparent density (g/cm$^2$) | 0.261 | 0.247 |
| Porosity (%) | 84 | 85 |
| Average macropore diameter ($\mu$m) | 24 | 25 |
| Specific surface area (m$^2$/g) | 586 | 818 |
| Maximum value (Å) of the pore diameter distribution | <10 | 18 |
| Pore volume of pores with a pore diameter of 15 to 200 Å (cm$^3$/g) | 0.052 | 0.14 |

Using the two samples obtained as above, separation of nitrogen from oxygen in air was carried out by the pressure swing adsorption (PSA) method.

Each of the above samples was molded and filled in an adsorption tower having inside diameter of 30 cm and a length of 1200 mm in a two-tower type PSA device, and the adsorption separation experiment was conducted under the following operating conditions.

Adsorption pressure: 4 kg/cm$^2$G
Flow rate of air: 200N ml/min.

The two adsorption towers were used alternately with an adsorption time of 1 minute and a desorption time of 1 minute. At the time of desorption, the gas was forcibly evacuated by a vacuum pump.

The concentration of the outlet gas from the adsorption tower was analyzed. With sample No. 4, it contained nitrogen in a concentration of 99.2%, but with sample No. 5, its nitrogen concentration was 79.1% showing the same composition as the inlet air.

EXAMPLE 3

(1) Seven kilograms of polyvinyl alcohol having a degree of polymerization of 1700 and a degree of saponification of 99%, and 2.5 kg of potato starch was added, and the mixture was heated with stirring to form a solution. The solution was cooled to room temperature, and 9 kg of 37% formalin and 2 kg of 50% sulfuric acid were added. A suitable amount of water was further added to provide 100 liters of a mixture.

The mixture was cast in a square mold having a size of 400×200 mm, and subjected to crosslinking reaction for 3 days in hot water at 60° C. The product was washed with water to give a porous body of polyvinyl formal having a network structure. The polyvinyl formal porous body was then cut into a solid cylinder having a diameter of 170 mm and a length of 400 mm, immersed in a solution of a water-soluble resol resin (BRL-2854, a product of Showa Polymer Co., Ltd.) in an adjusted concentration, and then dried at 80° C. for 24 hours to form a porous body of a synthetic resin containing 70% of the resol resin.

Figure 2:
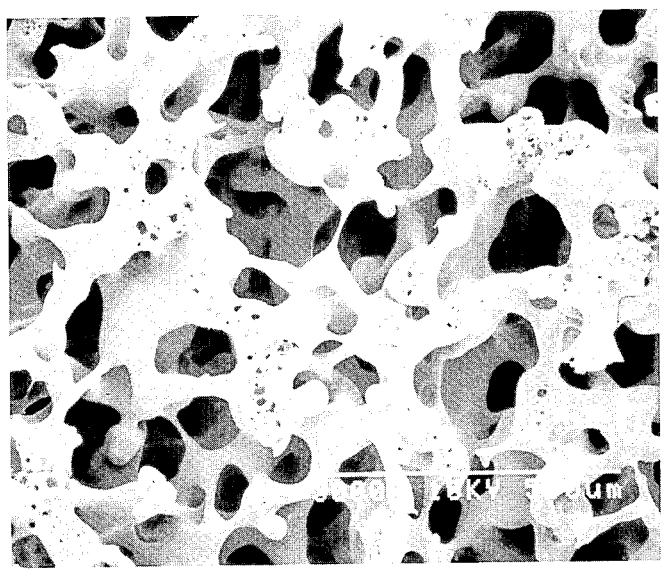
FIG. 2 is a scanning electron micrograph (magnification 100×) of the carbonaceous porous body used in this invention.
Figure 7:
FIG. 7 is a scanning electron micrograph (magnification 100×) of granular MSC.

The resulting porous body was placed in an electrical furnace, heated at a rate of 100° C./hr to 200° C. and then at a rate of 30° C./hr, and carbonized at 660° C. to produce a cylindrical adsorbent having an average macropore diameter of 200 micrometers, an apparent density of 0.52 g/cm$^3$, a porosity of 68%, a diameter of 100 mm and a length of 250 mm. A scanning electron micrograph (magnification 100×) of a cross section of this adsorbent is shown in FIG. 2. In FIG. 2, the cavities are macropores.

(2) Four cylindrical adsorbents so obtained were filled in an adsorption tower in a longitudinally connected state (the filling volume of the adsorbents in each adsorption tower was 100 mm $\phi$ ×1000 mm L). The adsorbents were sealed by the inner wall surface of the adsorption tower.

Figure 3:
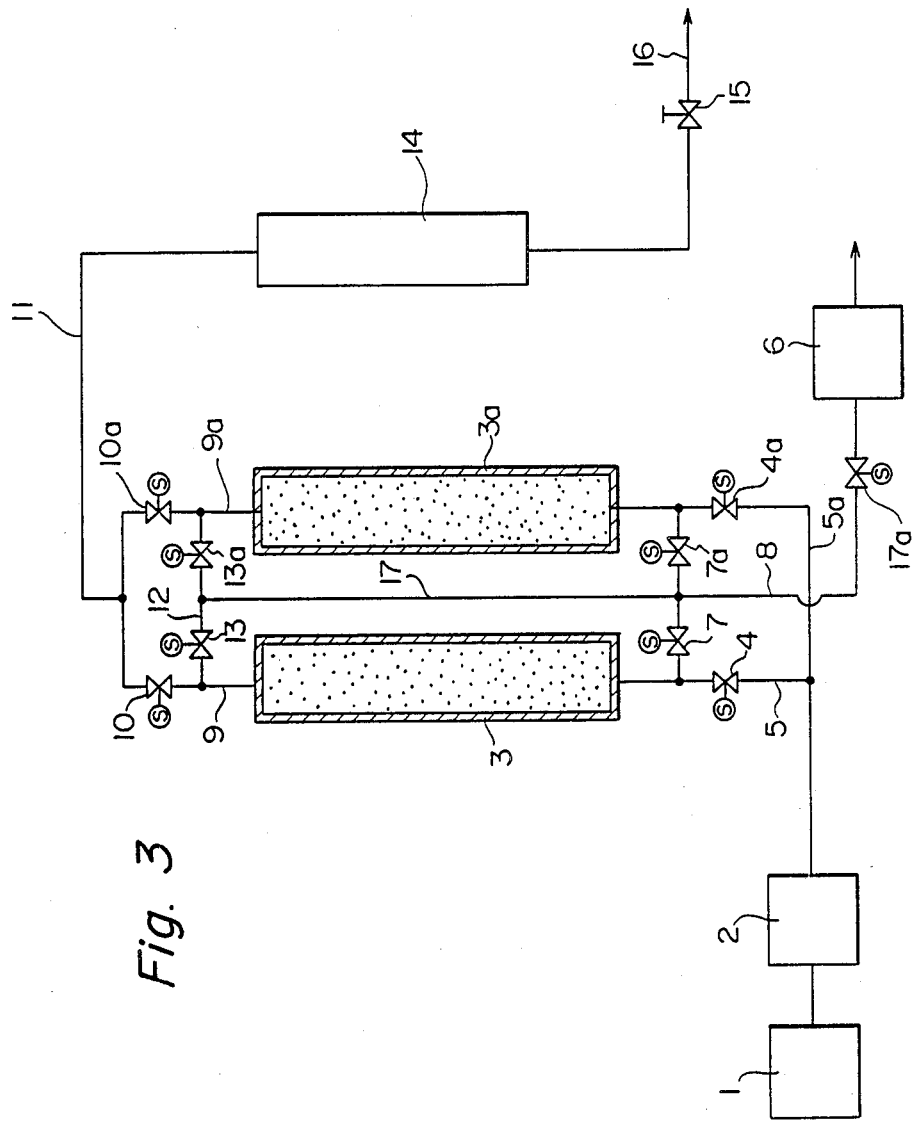
FIG. 3 is a schematic view of one example of an apparatus for practicing the present invention.

A PSA device of the type shown in FIG. 3 of the accompanying drawings was built by using two adsorption towers obtained as above. In FIG. 3, the reference numeral 1 represents an air compressor and 2, an air dryer. 3 and 3a represent adsoprtion towers having adsorbents therein in a sealed condition. The inlets of these adsorption towers communicate with the outlet of the air dryer 2 via inflow passage pipes 5 and 5a having first on-off valves 4 and 4a. 6 represents a vacuum pump and is connected to the inlets of the adsorption towers 3 and 3a by a suction passage pipe 8 equipped with valves 7 and 7a. 9 and 9a represent withdrawal passage pipes extending from the outlets of the adsorption towers 3 and 3a respectively and are equipped with second on-off valves 10 and 10a. These pipes 9 and 9a are connected to a main pipe 11. 12 represents a pressure equalization pipe having valves 13 and 13a and is in communication with the outlets of the adsorption towers 3 and 3a. The main pipe 11 is connected to a reservoir tank 14 from which the product is taken out through a product withdrawal pipe 16 having a needle valve 15.

(3) In this device, separation of oxygen and nitrogen in the starting air is carried out as follows: starting air is compressed by the air compressor 1, dried by the air dryer 2, and in this state, fed into one adsorption tower 3 from its inlet via the inflow passage pipe 5. At this time, the valve 4a of the inflow passage pipe 5a of the other adsorption tower 3a is off. The compressed air entering the adsorption tower 3 rises through the open cells of the adsorbents formed in a three-dimensional network structure as flow passages. During this time, oxygen molecules are adsorbed on the adsorbent and removed, and at the outlet of the adsorption tower 3, a high-concentration nitrogen gas is obtained. The nitrogen gas flows from the withdrawal passage pipe 9 and reaches the reservoir tank 14 via the main pipe 11. It is stored in the reservoir tank 14, and withdrawn through the pipe 16. At this time, the valve 10a of the withdrawal passage pipe 9a of the other adsorption tower 3a and the valves 13 and 13a of the pressure equalization pipe 12 are off. While the above adsorption operation is carried out in the adsorption tower 3, the adsorbents are regenerated in the other adsorption tower 3a by evacuation. Specifically, the outlet side of the other adsorption tower 3a is closed with the valves 10a, 13 and 13a. By operating the vacuum pump 6 while closing the valve 7 of the suction passage pipe 8 and opening the valves 7a and 17a, the inside of the adsorption tower 3a is evacuated by a countercurrent, and the adsorbents are regenerated. The adsorption tower 3 after the adsorption step and the adsorption tower 3a after the regeneration step are brought into communication with each other by the pipe 17, the valve 13 and the valve 7a for pressure equalization. Specifically, only the valve 13 on the outlet side of the adsorption tower 3 and the valve 7a on the inlet side of the adsorption tower 3a are open, and all other valves are closed. The gas within the adsorption tower 3 which is under a higher pressure goes out from the outlet and enters the inlet of the adsorption tower 3a, whereby pressure equalization is achieved.

Thereafter, the valves 13 and 7a are closed and the valve 4a is opened. The adsorption tower 3a thus sets in the pressure elevation and adsorption steps. Meanwhile, the valves 4 and 10 are closed in the adsorption tower 3, and the valves 7 and 17a are opened. Thus, the regeneration step is started in the adsorption tower 3. All of the above valves are electromagnetic valves, and the series of the valve operations as above are controlled by an on-off control device (not shown). The adsorption pressure at this time is adjusted to 4 kg/cm$^2$·G, and the evacuation for regeneration of the adsorbent is carried out to a pressure of less than 100 torr by a vacuum pump. The above adsorbents had a specific surface area of 640 m$^2$/g. When 13 g of a sample of this adsorbent was placed in a 450 cc receptacle, and the amounts of O$_2$ and N$_2$ adsorbed were measured on a trial at an initial pressure of 2.5 kg/cm$^2$·G, the amount of O$_2$ adsorbed was 24.1 mg/g and the amount of N$_2$ adsorbed was 3.4 mg/g, both after 1 minute.

The states of pressures which were created in the adsorption towers 3 and 3a by the above series of operations are shown in Table 3. The relation between the amount of the product gas withdrawn and its purity is shown in Table 4.

TABLE 3

| Time (seconds) | Adsorption tower (1) | Adsorption tower (2) |
| --- | --- | --- |
| 20 | Pressure elevation (concurrent) | Evacuation (countercurrent) |
| 60 | Adsorption (concurrent) | |
| 5 | Pressure equalization (reduction) (concurrent) | Pressure equalization (elevation) (concurrent) |
| 20 | Evacuation (countercurrent) | Pressure elevation (concurrent) |
| 60 | | Adsorption (concurrent) |
| 5 | Pressure equalization (elevation) (concurrent) | Pressure equalization (reduction) (countercurrent) |

TABLE 4

| Amount of nitrogen gas withdrawn (liters/min.) | Concentration of $O_2$ (%) Example 3 | Concentration of $O_2$ (%) Comparative Example 1 |
| --- | --- | --- |
| 5 | 0.05 | 0.05 |
| 10 | 0.05 | 0.11 |
| 20 | 0.09 | 0.91 |
| 30 | 0.51 | 2.4 |
| 45 | 1.3 | 5.9 |
| 60 | 3.6 | 10.3 |
| 75 | 8.4 | 15.6 |

The results shown for Comparative Example 1 in Table 2 were obtained when granular MSC having a particle diameter of about 1 mm $\phi \times 3$ mm L was filled in the same two adsorption towers as used in Example 3 so that the amount of filling was 100 mm $\phi \times 1000$ mm L, and separating air using these adsorption towers. The filling density of MSC at this time was 0.61 g/cm$^3$. The granular MSC had a specific surface area of 560 m$^2$/g, and the amounts of $O_2$ and $N_2$ adsorbed on it, measured by the same method as in Example 3 above, were 22.1 mg/g and 3.8 mg/g, respectively.

EXAMPLE 4

(1) Five kilograms of polyvinyl alcohol having a degree of polymerization of 1,700 and a degree of saponification of 99% was dispersed in water, and the dispersion was heated to form a solution. Then, 3 kg of potato starch was gelatinized in the polyvinyl alcohol solution. The product was cooled to room temperature, and 7 kg of 37% formalin and 2.5 kg of 50% sulfuric acid was added. They were uniformly mixed, and the total amount of the mixture was adjusted to 100 liters by using a suitable amount of water.

The mixture was cast in a mold having a size of 420 $\phi \times 28$ $\phi \times 900$ mm L, and subjected to crosslinking reaction in hot water at 60° C. for 24 hours. The reaction product was washed with water to obtain a porous body of polyvinyl formal (PVF) having a network structure. The PVF porous body was cut into a cylindrical shape having a size of 400 $\phi \times 28$ $\phi \times 350$ mm L and then immersed in a solution of melamine resin (Sumitex Resin M-3, a product of Sumitomo Chemical Co., Ltd.) in a solids concentration of 40%. After centrifugation, the applied melamine resin was cured at 90° C. for 24 hours. The product was further immersed in a solution of water-soluble resol resin (BRL-2854, a product of Showa Polymer Co, Ltd.) in a solids concentration of 40%, and then heat-treated at 90° C. for 24 hours to cure the resol resin. Thus, a porous body of synthetic resin composed of 20% of polyvinyl formal, 40% of the melamine resin and 40% of the phenolic resin was obtained.

The synthetic resin porous body was placed in an electrical furnace, and heated at 60° C. in an atmosphere of nitrogen and carbonized at 670° C. to obtain an adsorbent. It was cut into a cylindrical adsorbent having an outside diameter of 250 mm $\phi$, an inside diameter of 20 mm $\phi$, a height of 60 mm, an average pore diameter of 100 micrometers, an apparent density of 0.56 g/cm$^3$ and a porosity of 65%.

Figure 4:
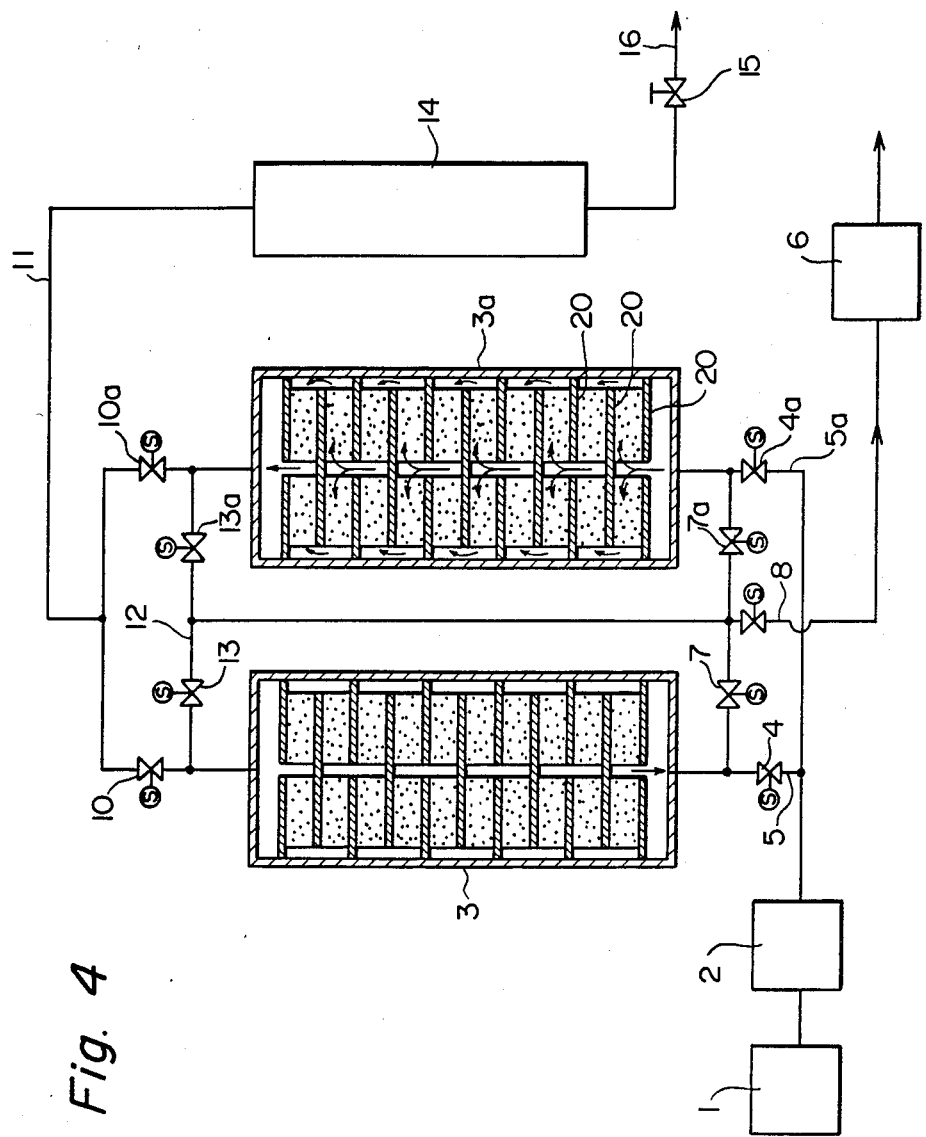
FIG. 4 is a schematic view of another example of the apparatus for practicing the invention.

(2) Such adsorbents were filled in an adsorption tower as shown in FIG. 4. The upper end surfaces and the lower end surfaces were sealed respectively with shielding plates 20 so that the space between the outer circumferential surface and the inner circumferential surface became a flow passage. The other parts of the device were the same as in FIG. 3, and the operations were substantially the same. Hence, a description of these is omitted. In FIG. 4, the adsorption is carried out in the adsorption tower 3a, and the desorption is carried out in the adsorption tower 3.

In this device, flowing of the starting air and evacuation were carried out in a part between the inside circumferential surface and the outside circumferential surface of the cylindrical adsorbent as shown by arrows in FIG. 4. The pressure at the time of adsorption was 5 kg/cm$^2$·G, and the evacuation was carried out so that the pressure was reduced to less than 100 torr. The states of pressures in the adsorption towers 3 and 3a in this device are shown in Table 5. The relation between the amount of the nitrogen gas taken out as a product and its purity is shown in Table 6.

TABLE 5

| Time (seconds) | Adsorption tower (1) | Adsorption tower (2) |
| --- | --- | --- |
| 15 | Pressure elevation (concurrent) | Evacuation (countercurrent) |
| 70 | Adsorption (concurrent) | |
| 5 | Pressure equalization (reduction) (concurrent) | Pressure equalization (elevation) (concurrent) |
| 15 | Evacuation (countercurrent) | Pressure elevation (concurrent) |
| 70 | | Adsorption (concurrent) |
| 5 | Pressure equalization (elevation) (concurrent) | Pressure equalization (reduction) (countercurrent) |

(Note 1): The adsorption pressure was 5 kg/cm$^2$·G, and the pressure at the time of evacuation decreased to 100 torr.

TABLE 6

| Amount of nitrogen gas taken out (liter/min.) | Concentration of $O_2$ (%) |
| --- | --- |
| 10 | 0.04 |
| 20 | 0.07 |
| 30 | 0.3 |
| 40 | 0.85 |
| 50 | 1.58 |
| 60 | 2.9 |

EXAMPLE 5

(1) In the same way as in Example 4, 4 kg of polyvinyl alcohol having a degree of polymerization of 1,700 and a degree of saponification of 88% was dissolved in hot water, and then 3 kg of wheat starch was added and gelatinized. To the product was added 20 kg of a solution of water-soluble resol resin (BRL-2854, a product of Showa Polymer Co., Ltd.) in a solids concentration of 60%. The mixture was fully stirred, and 7 kg of 37% formalin and 3 kg of 30% oxalic acid were added. They were uniformly mixed, and the amount of the mixture was finally adjusted to 100 liters using a suitable amount of water.

The mixture was cast in a mold having a size of 320 $\phi \times 28$ $\phi \times 1000$ mm L, and reacted as in Example 3 to obtain a porous body of a PVA/phenol synthetic resin. The porous body was cut into a cylindrical shape having a size of 300 $\phi \times 28$ $\phi \times 750$ mm L, and the melamine resin was applied as in Example 3 to obtain a porous body of a synthetic resin composed of 20% of polyvinyl alcohol, 20% of the melamine resin and 60% of the phenolic resin.

The porous body was placed in an electrical furnace, and heated to a predetermined temperature in an atmosphere of nitrogen at a temperature elevation rate of 50° C./hr and activated in an atmosphere of steam for a predetermined period of time to form a cylindrical adsorbent having an outside diameter of 200 mm $\phi$, an inside diameter of 20 mm $\phi$ and a height of 500 mm. The adsorbent had an average pore diameter of 300 micrometers, an apparent density of 0.60 g/cm$^3$ and a porosity of 62%.

Figure 5:
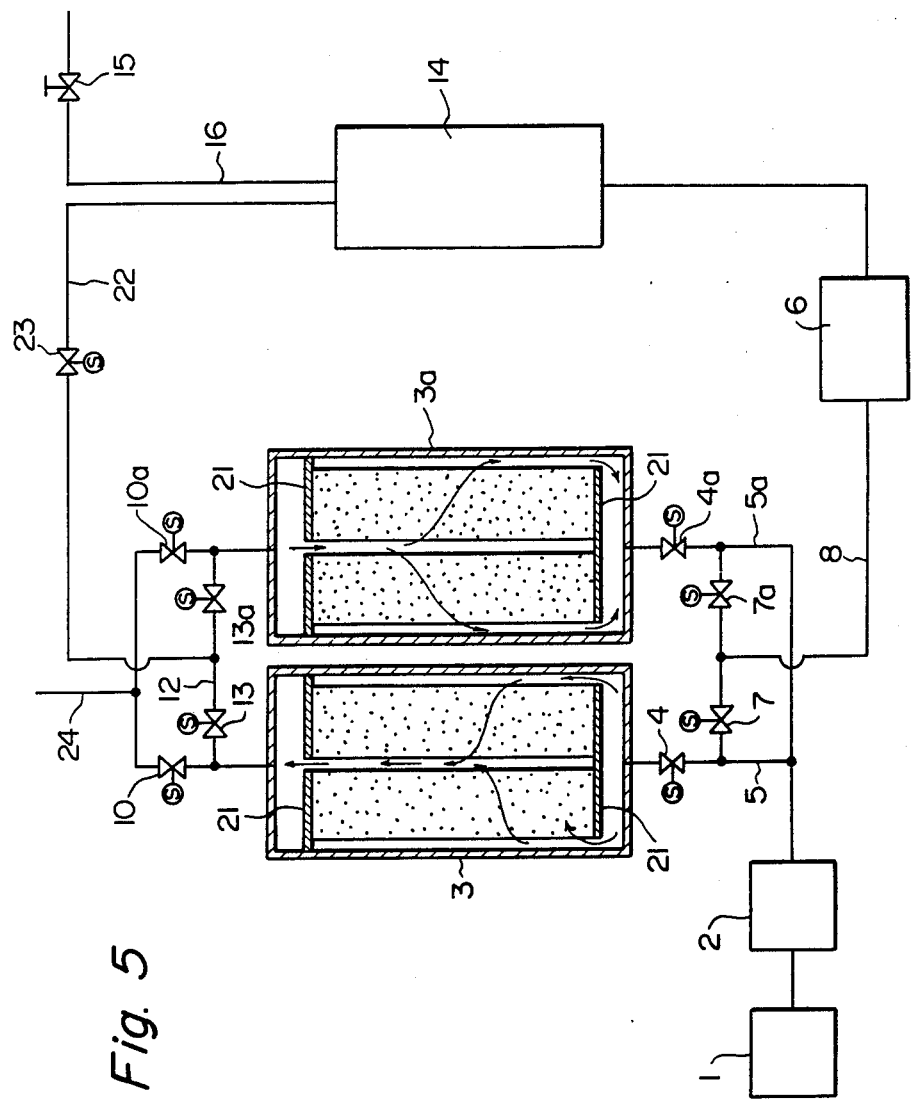
FIG. 5 is a schematic view of still another example of the apparatus for practicing the invention.

(2) Two such adsorbents were longitudinally connected and filled in an adsorption tower having an inside diameter of 220 mm and an effective length of 1000 mm. The connecting parts were closely adhered to each other, and as shown in FIG. 5, the upper and lower end surfaces of the connected adsorbent unit were sealed with thermoplastic resin plates 21. In this state, the adsorbents were filled into adsorption towers 3 and 3a. The reference numeral 22 in FIG. 5 represents a purging pipe having a valve 23, and keeps the reservoir tank 14 and the outlets of the adsorbent towers 3 and 3a in communication with each other. The reference numeral 24 represents a release pipe. The other parts are substantially the same as in FIG. 3.

This device is designed for production of oxygen-enriched air. Oxygen is adsorbed in the adsorption tower 3, and air rich in nitrogen is released from the outlet of the adsorption tower 3 by the release pipe 24 as shown by an arrow. Simultaneously, for desorption of oxygen adsorbed on the adsorbent in the other adsorption tower 3a, the oxygen-enriched air stored in the reservoir tank 14 is fed into the adsorption tower 3a from the purging pipe 22 to purge the adsorption tower 3a. Simultaneously, oxygen is taken out from the inlet of the adsorption tower 3a by sucking with the vacuum pump 6, and stored in the reservoir tank.

The adsorbent had a specific surface area of 625 m$^2$/g, and the amounts of O$_2$ and N$_2$ adsorbed on it measured by the method described in Example 3 were 23.8 ml/g and 3.2 mg/g.

The states of pressures in the adsorption towers in the production of oxygen-enriched air by using the above device are shown in Table 7. The relation between the product air taken out and its purity is shown in Table 8.

TABLE 7

| Time (seconds) | Adsorption tower (1) | Adsorption tower (2) |
| --- | --- | --- |
| 10 | Pressure elevation (concurrent) | Pressure reduction (concurrent) |
| 30 | Adsorption (concurrent) | Purging of the product gas (countercurrent) |
| 60 | | Desorption (countercurrent) |
| 10 | Pressure reduction (concurrent) | Pressure elevation (concurrent) |
| 30 | Purging of the product gas (countercurrent) | Adsorption (concurrent) |
| 60 | Desorption (countercurrent) | |

(Note 1): The adsorption pressure was 4 kg/cm$^2$·G. After the pressure was reduced to a predetermined pressure in the pressure-reducing step, the purging step set in.
(Note 2): The purged gas obtained by using the product gas and the desorbed gas obtained by the vacuum pump were recovered as a product gas.

TABLE 8

| Amount of the starting air fed (liter/min.) | Pressure within the tower after completion of the pressure reducing step (kg/cm$^2$·G) | Amount of oxygen-enriched air withdrawn (liters/min.) | Concentration of O$_2$ (%) |
| --- | --- | --- | --- |
| 600 | 2 | 45 | 26.4 |
| 600 | 1 | 37 | 29.1 |
| 600 | 0 | 32 | 33.8 |

Note: One-third of the product gas was used as a purge gas.

EXAMPLE 6

An adsorbent having an average macropore diameter of 300 micrometers, an apparent density of 0.58 g/cm$^3$ and a porosity of 64% was produced in the same way as in Example 3, and set in the same device as used in Example 3. The pressure at the time of adsorption was adjusted to 7 kg/cm$^2$·G. The adsorbent was regenerated at atmospheric pressure without using a vacuum pump.

The amount of nitrogen gas withdrawn was 10 liters/min., and it contained 0.09% of O$_2$. When the amount of the nitrogen gas withdrawn was 20 liters/min., it contained 0.9% of oxygen.

EXAMPLE 7

In the same way as in Example 5, a cylindrical porous body of PVA/phenol synthetic resin having a diameter of 170 mm and a length of 400 mm composed of 25% by weight of polyvinyl alcohol and 75% by weight of a phenolic resin was obtained.

The porous body was placed in an electrical furnace, heated in an atmosphere of nitrogen at a rate of 60° C./hr, and maintained at 680° C. for 2 hours to carbonize it. As a result, a cylindrical adsorbent was obtained which had an average macropore diameter of 250 micrometers, an apparent density of 0.54 g/cm$^3$, a porosity of 67%, a diameter of 100 mm and a length of 250 mm. Four such cylindrical adsorbents connected to each other longitudinally were filled in each of two adsorbent towers as in Example 3 (the filling volume of the adsorbents in each tower was 100 mm $\phi \times 1000$ mm L). The side surface of the adsorbent was sealed by an epoxy resin, and the end surface of the adsorbent was sealed by a packing. In this manner, a PSA device of the same structure as in FIG. 3 was built. A starting gaseous mixture composed of 70% of hydrogen gas and 30% of methane was introduced into this device and the separation of hydrogen gas was carried out.

As in Example 3, the device was operated under the operating conditions shown in Table 9, and the relation between the amount of hydrogen gas withdrawn and its purity was examined. The adsorption pressure was adjusted to 9 kg/cm$^2$·G, and the regeneration of the adsorbent was carried out under a reduced pressure of less than 100 torr. The relation between the amount of the hydrogen gas withdrawn and its purity is shown in Table 10.

The cylindrical adsorbent filled in the adsorption tower had a specific surface area of 64 m$^2$/g.

The results of Comparative Example 2 in Table 10 were obtained when granular MSC having a size of 3 mm $\phi \times$ 6 mm L was filled into two adsorption towers as in Example 3 to a filling volume of 100 mm $\phi \times$ 1000 mm L, and the same hydrogen separating operation as in Example 7 was carried out using these adsorption towers. The filling density of the granular MSC was 0.57 g/cm$^3$, and its specific surface area was 610 m$^2$/g.

TABLE 9

| Time (seconds) | Adsorption tower (1) | Adsorption tower (2) |
| --- | --- | --- |
| 30 | Pressure elevation (concurrent) | Evacuation (countercurrent) |
| 180 | Adsorption (concurrent) | |
| 10 | Pressure equalization (reduction) (concurrent) | Pressure equalization (elevation) (concurrent) |
| 30 | Evacuation (countercurrent) | Pressure elevation (concurrent) |
| 180 | | Adsorption (concurrent) |
| 10 | Pressure equalization (elevation) (concurrent) | Pressure equalization (reduction) (concurrent) |

TABLE 10

| Amount of hydrogen gas withdrawn (liters/min.) | H$_2$ concentration (%) | |
| --- | --- | --- |
| | Example 7 | Comparative Example 2 |
| 10 | 99.999 | 99.990 |
| 20 | 99.99 | 99.90 |
| 30 | 99.8 | 99.2 |
| 40 | 98.6 | 97.4 |
| 60 | 95.9 | 93.2 |
| 80 | 89.1 | 84.1 |

EXAMPLE 8

As in Example 7, a starting gaseous mixture of 75% of hydrogen gas and 25% of carbon dioxide was introduced and separation of hydrogen gas was carried out. The operating conditions of the PSA device were the same as in Example 7. Comparative Example 3 was carried out as in Comparative Example 2.

Table 11 shows the relation between the amount of the product gas withdrawn and its purity.

TABLE 11

| Amount of hydrogen gas withdrawn (liters/min.) | H$_2$ concentration (%) | |
| --- | --- | --- |
| | Example 8 | Comparative Example 3 |
| 15 | 99.999 | 99.990 |
| 30 | 99.99 | 99.90 |
| 50 | 99.2 | 97.6 |
| 70 | 96.7 | 95.1 |
| 90 | 92.9 | 88.6 |

EXAMPLE 9

As in Example 7, a starting gaseous mixture composed of 50% of carbon monoxide and 50% of methane was introduced, and the separation of carbon monoxide was tested. The operating conditions of the PSA device are shown in Table 12. The adsorption pressure was 9 kg/cm$^2$·G, and the regeneration was carried out at less than 100 torr.

The relation between the amount of carbon monoxide withdrawn and its purity is shown in Table 13. In Table 13, the values shown for Comparative Example 3 were obtained by performing the separation experiment using granular MSC as in Comparative Example 2.

TABLE 12

| Time (seconds) | Adsorption tower (1) | Adsorption tower (2) |
| --- | --- | --- |
| 15 | Pressure elevation (concurrent) | Evacuation (countercurrent) |
| 40 | Adsorption (concurrent) | |
| 5 | Pressure equalization (reduction) (concurrent) | Pressure equalization (elevation) (concurrent) |
| 15 | Evacuation (countercurrent) | Pressure elevation (concurrent) |
| 40 | | Adsorption (concurrent) |
| 5 | Pressure equalization (elevation) (concurrent) | Pressure equalization (reduction) (concurrent) |

TABLE 13

| Amount of carbon monoxide gas withdrawn (liters/min.) | CO concentration (%) | |
| --- | --- | --- |
| | Example 9 | Comparative Example 3 |
| 5 | 99.9 | 99.2 |
| 10 | 99.1 | 98.6 |
| 20 | 97.4 | 93.5 |
| 30 | 94.1 | 89.8 |

What is claimed is:

1. A method of separating at least a first gas from a gaseous mixture, which comprises contacting a gaseous mixture containing a first and a second gas having different chemical compositions in an amount of at least 50% by volume based on the entire mixture with a molecular sieving carbonaceous porous body, said porous body having (1) a carbon content of at least 85% by weight, (2) an apparent density of 0.1 to 0.8 g/cm$^3$, (3) a porosity of 50 to 95%, (4) a maximum value of the pore diameter distribution at a pore diameter of not more than 10 Å and a pore volume at a pore diameter in the range of 15 to 200 Å of not more than 0.1 cm$^3$/g and containing (5) open cells in a three-dimensional network structure so that the open cells of the porous body form substantial flow passages for the gaseous mixture, thereby to adsorb at least the second gas physically on the porous body, said open cells having an average diameter of 1 to 500 micrometers.

2. The method of claim 1 wherein the first gas is nitrogen, the second gas is oxygen, and the gaseous mixture is air.

3. The method of claim 1 wherein the first gas is hydrogen and the second gas is methane.

4. The method of claim 1 wherein the first gas is hydrogen, the second gas is carbon dioxide.

5. The method of claim 1 wherein the first gas is carbon monoxide, and the second gas is methane.

6. The method of claim 1 wherein the amount of the first and second gases is at least 75% by volume of the entire gaseous mixture.

7. The method of claim 1 wherein the porous body has a carbon content of at least 90% by weight.

8. The method of claim 1 wherein the open cells of the porous body are used as substantial flow passages of the gaseous mixture by providing a container having an inlet and an outlet for the gaseous mixture at positions separated from each other, filling the porous body having a cross-section having substantially the same size and shape in contour as those of a cross-section of the container space taken at right angles to the direction extending from the inlet to the outlet, and passing the gaseous mixture from the inlet of the container.

9. The method of claim 1 wherein at least a part of the outside surface of the porous body in a direction parallel to the direction in which the gaseous mixture passes through the open cells of the porous body is sealed air-tight against the gaseous mixture.

10. The method of claim 1 wherein the porous body is cylindrical, circular or disc-like.

11. The method of claim 1 wherein the gaseous mixture is contacted with the porous body under atmospheric to elevated pressure.

12. A method of separating a first gas from a second gas, which comprises the steps of flowing a gaseous mixture containing said first and second gases, the sum of the amounts of said first and second gases being at least 50% by volume, based on the entire amount of said gaseous mixture, through a bed consisting of a carbonaceous porous body having a carbon content of at least 85% by weight, said porous body having macropores providing open, intercommunicating cells distributed in a three-dimensional network structure and defining gas flow passages through said porous body, said cells having an average pore diameter of 1 to 500 micrometers, the walls of said cells having micropores therein for adsorbing said second gas, said porous body having (1) an apparent density of from 0.1 to 0.8 g/cm$^2$, (2) a porosity of 50 to 95%, (3) a maximum value of the pore diameter distribution at a pore diameter of not more than 10 Å and (4) a pore volume at a pore diameter in the range of 15 to 200 Å of not more than 0.1 cm$^3$/g, said carbonaceous porous body having been prepared by forming a synthetic resin porous body consisting essentially of 10 to 50% by weight of polyvinyl alcohol, 10 to 40% by weight of melamine resin and the balance is essentially phenolic resin, and then carbonizing said synthetic resin porous body in a nonoxidizing atmosphere at a temperature of 500° to 700° C.

13. A method as claimed in claim 12 in which said gaseous mixture contains at least 90% by volume of said first and second gases, said porous body has an apparent density of 0.3 to 0.65 g/cm$^3$ and a porosity of 60 to 82%, and said cells have an average pore diameter of 10 to 300 micrometers.

14. A method as claimed in claim 12 in which after carbonizing said synthetic resin porous body, said carbonized porous body is heat treated in an oxidizing atmosphere at a temperature of 500° to 700° C. so that the weight loss of said carbonized porous body is up to 15% by weight.

15. A method as claimed in claim 12 in which the pressure of said gaseous mixture is from 2 to 9 kg/cm$^2$ the temperature is from zero to 35° C. and the flow rate of said gaseous mixture is from 1 to 50 cm/sec.

* * * * *